United States Patent [19]
Lin et al.

[11] Patent Number: 5,748,376
[45] Date of Patent: May 5, 1998

[54] HIGH OPTICAL THROUGHPUT LIQUID-CRYSTAL PROJECTION DISPLAY SYSTEM

[75] Inventors: Kun-Wei Lin, Hsinchu Hsien; Han-Ping D. Shieh, Hsinchu; San-Ming Chen, Taipei; Kuang-Vu Chen, Taipei Hsien; Chong-Min Chang, Taipei, all of Taiwan

[73] Assignee: Industrial Technology Research Institute, Hsinchu, Taiwan

[21] Appl. No.: 633,449

[22] Filed: Apr. 17, 1996

[51] Int. Cl.$^6$ .............................. G02B 27/14; G02B 5/30; G02F 1/1335; F21V 7/04
[52] U.S. Cl. .......................... 359/629; 362/268; 362/32; 359/48; 359/485
[58] Field of Search ....................... 359/629, 485, 359/490, 494; 349/9; 362/19, 32; 385/11, 146

[56] References Cited

U.S. PATENT DOCUMENTS 4,918,583  4/1990  Kudo et al. .............................. 366/268

*Primary Examiner*—Georgia Y. Epps
*Assistant Examiner*—John P. Cornely
*Attorney, Agent, or Firm*—Rabin, Champagne & Lynt, P.C.

[57] ABSTRACT

A liquid-crystal projection display system with higher efficiency is provided. The liquid-crystal projection display system comprises a double-layer square-pillar-like integrator, including an inner layer and an outer layer, having a polarization-separating thin film formed between the inner layer and the outer layer. The system also includes a converging light source for generating light converged at a point near one end surface of the double-layer square-pillar-like integrator, so that most light emitted from the light source enters the double-layer square-pillar-like integrator, and different polarized light is transmitted by being totally reflected off of surfaces of the inner layer and the outer layer respectively. A first lens is provided for forming real light spots on an image plane from virtual light spots formed by totally reflecting the different polarized light transmitted in the double-layer square-pillar-like integrator. A polarization rotator is located at the image plane, for rotating one of the polarizations of the real light spots, while keeping another one of the polarizations unchanged, so that the polarization angles of all the real light spots are identical. A second lens is provided for evenly converging and projecting light beams from the light spots with an identical linear polarization to overlay on an object.

12 Claims, 8 Drawing Sheets

HIGH OPTICAL THROUGHPUT LIQUID-CRYSTAL PROJECTION DISPLAY SYSTEM

BACKGROUND OF THE INVENTION

1. Field of the Invention

The present invention relates to an illumination system, and more particularly to a liquid-crystal projection-display system with high optical throughput.

2. Description of Prior Art

A liquid-crystal projecting television is critical in today's large-screen display since the television has high quality and vivid chroma, and occupies a relatively small volume of space as well. However, it still cannot meet the requirement of customers with respect to the illumination and uniformity of the screen. The reasons for such inferior uniformity and low efficiency are: In the prior-art projection device, the illumination distribution of the central portion is two to three times that of the peripheral portion, since the light source collected by a reflector is not a point source. Moreover, the cross section of an incident light beam is circular, but the shape of a typical display is rectangular and has a width/height ratio of 4:3 or 16:9. Therefore, the projection efficiency is reduced due to the mismatch of the cross section of the incident light beam and the shape of the display. In addition, the theory of operation of a liquid-crystal display is to modulate the polarization of the incident light beam, and it has to place polarizers in front of and behind to the liquid-crystal panel to define the polarization of the input and output beams. Hence, more than half of the energy of the incident light beam is going to be absorbed by the first polarizer while the incident light beam is passing through it. However, the energy being absorbed creates a high temperature that shortens the life of the liquid-crystal module.

Many different kinds of illumination systems have been described and fabricated to overcome the drawbacks above.

Those prior-art illumination systems may be applied to illuminate an object such as a slide, liquid-crystal panel or film, etc. However, the price and the device's characteristics such as weight, volume and illumination efficiency are the most critical factors to judge whether an illumination system is good or not. For example, U.S. Pat. No. 4,918,583, entitled "Illuminating Optical Device", referring to FIGS. 1 and 2 describes an illuminating device, which has an optical integrator capable of receiving light flux from a light source and substantially forming a plane light source having a plurality of light source images and uniformly illuminating an object, includes a square-pillar-like internal reflection type integrator 10 having a plurality of reflecting surfaces which can reflect the light flux from the light source and form a plurality of virtual images S1c, S2c, S1d and S2d of the light source So on a plane nearby the entrance surface 10a thereof. As shown in FIG. 2, a fly-eye type integrator comprises a plurality of lens elements for receiving the light flux from the light source and being capable of forming a plurality of light source images on a plane. The lens elements are juxtaposed in proximity to one another. Relay lens means are provided between the two integrators so that the exit surface of one of the two integrators adjacent to the light source and the entrance surface of the other integrator adjacent to the object are substantially conjugate with each other.

However, such an illumination system is not satisfactory for the use of a liquid-crystal projection system, since the light output from this prior-art illumination system is randomly polarized and therefore may result in some drawbacks, such as the generation of heat and a lowering of light efficiency, for the liquid-crystal module.

Another prior art publication, "Polarization Conversion System LCD Projection", disclosed by A. J. S. M. De Vaan et al., European Display 253 (1993), describes the use of two integrators to split and orient the waveform of the proceeding light to make the light distribution uniform and match the aspect ratio of the liquid-crystal display panel with the cross-sectional width/height ratio of the light beam. In addition, the prior-art projection system uses a Glan-Thompson prism to separate light having S-polarization and light having P-polarization and then uses a polarization rotator to convert one polarization (e.g., S-polarization) into another one (e.g., P-polarization). As a result, the liquid-crystal display panel may be irradiated by linearly polarized light. Referring to FIG. 3, the two integrators 15 and 20 are disposed to split the parallel light beam into a plurality of sub-beams which are superimposed over the position W1 to form a light beam of which the cross section is rectangular. Referring to both FIG. 3 and FIG. 4, the Glan-Thompson prism 30 splits the nonlinearly polarized light beam into the P-polarized light bp at the upper portion and the S-polarized light bs at the lower portion. Then the polarization rotator L is employed to change the polarization at the lower portion so that the original light beam becomes linearly polarized light after passing through the Glan-Thompson prism and the polarization rotator. While this system may resolve the problems occurring in the illumination system mentioned above, it results in some unavoidable problems: such as requiring a large volume of space, and a difficult manufacturing process.

SUMMARY OF THE INVENTION

Accordingly, it is a primary object of the present invention to provide a liquid-crystal projection display system which can reduce the number of parts and simplify the construction, and still can provide uniform illumination.

It is another object of the present invention to provide a liquid-crystal projection display system with high optical throughput, which adopts a double-layer square-pillar-like internal reflection type integrator having an optical thin film formed between the inner and outer layers thereof. The optical thin film can separate S-polarized light from P-polarized light, so that the light beam proceeding in the integrator can be totally reflected, and thus the S-polarized light and P-polarized light can be separated. Thereafter, polarizers are used to transverse one of the polarizations between the delay lenses. Thus the present invention can overcome the drawbacks encountered in the prior-art projection display system, and raise the performance of the projection display system.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1:
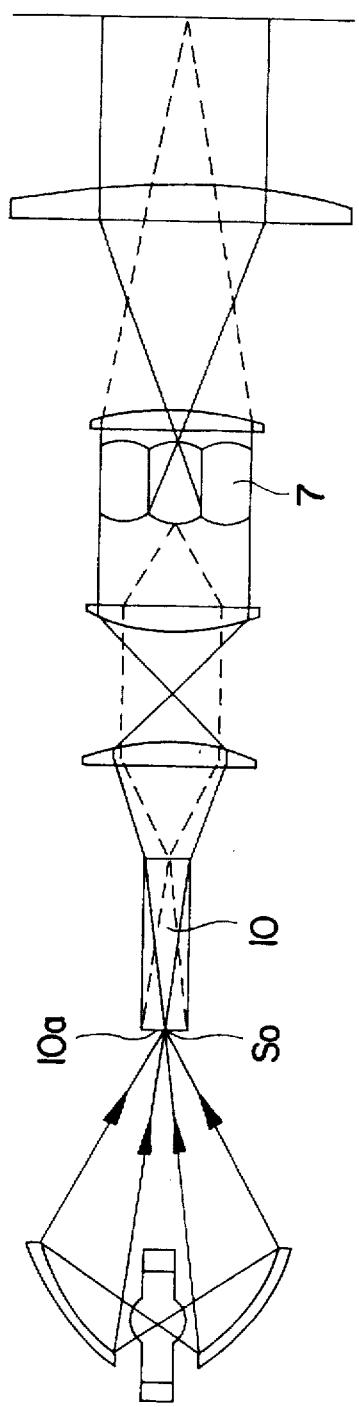
FIG. 1 is a diagram illustrating the architecture of a prior-art illumination optical device and schematic optical path thereof.
Figure 2:
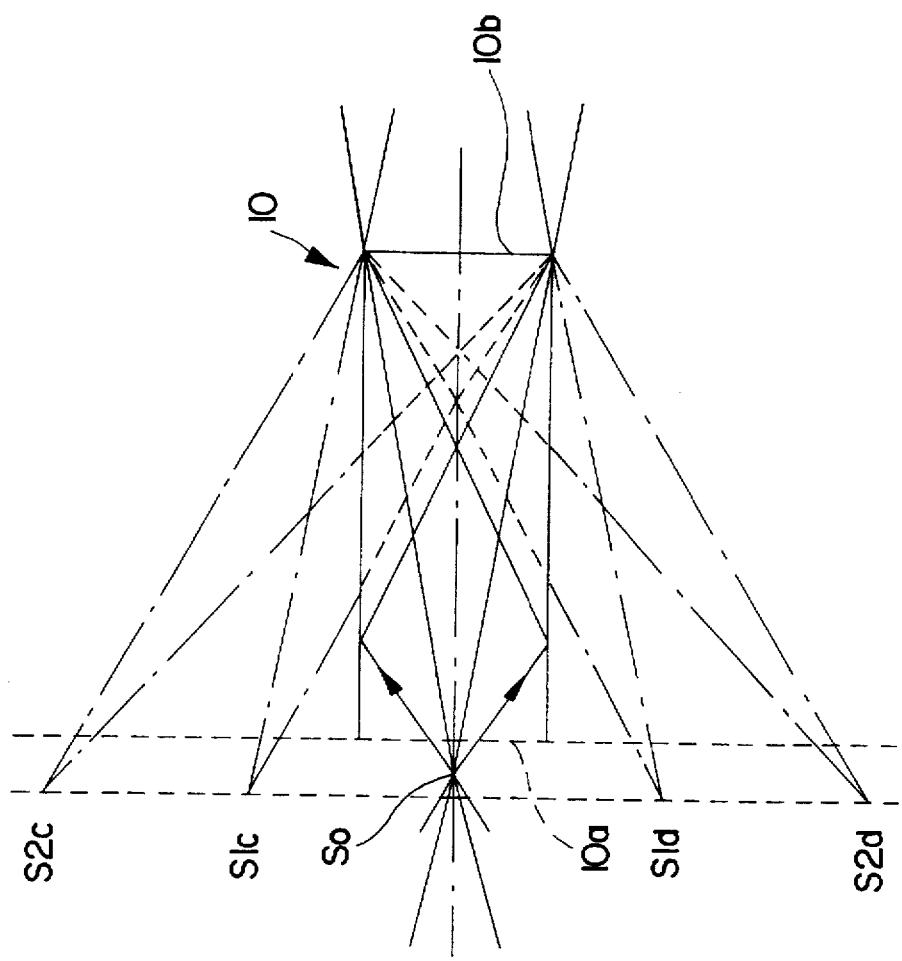
FIG. 2 is a diagram illustrating the optical path of the prior-art illumination optical device shown in FIG. 1.
Figure 3:
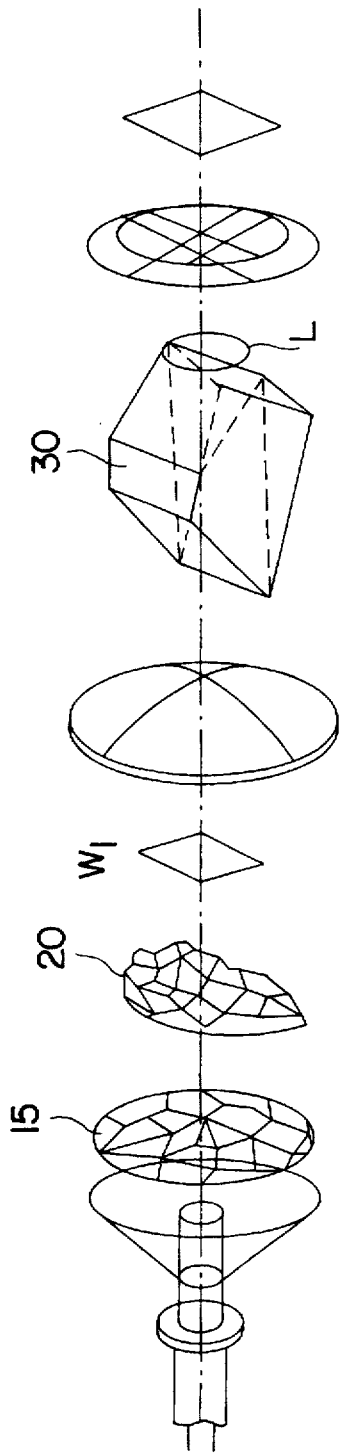
FIG. 3 is a diagram illustrating the architecture of another prior-art illumination optical device.
Figure 4:
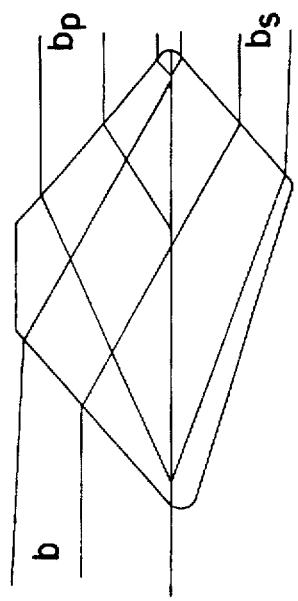
FIG. 4 is a diagram illustrating the optical track of a Glan-Thompson prism employed in the prior-art illumination optical device shown in FIG. 3.
Figure 5:
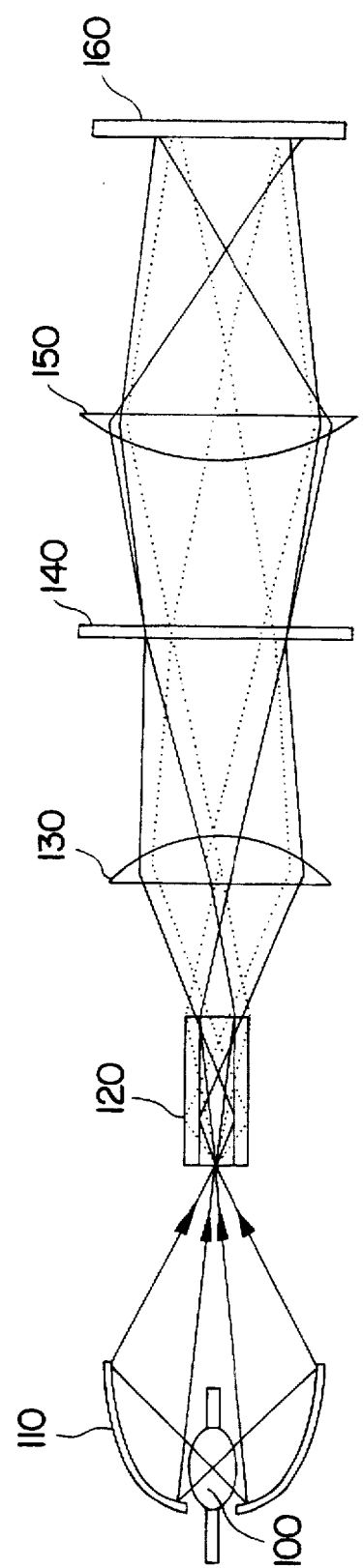
FIG. 5 is a diagram illustrating a preferred embodiment of the a liquid-crystal projection display system according to the present invention.

Referring to FIG. 5, the present invention includes: a light source 100; a reflecting mirror 110; a double-layer square-pillar-like integrator 120; a first lens 130; a polarization rotator 140; a second lens 150.

The light emitted from the light source 100 converges as a light spot nearby the front end of the double-layer square-pillar-like integrator 120 after being reflected by the reflecting mirror 110. Most of the light enters the double-layer square-pillar-like integrator 120, and is separated into two kinds of linearly polarized light, P-polarized light and S-polarized light. Then, all polarized light beams are respectively converged into a plurality of light spots by the first lens 130. The plurality of light spots are formed on the polarization rotator 140 which optionally rotates the polarization angles of each polarized light spot in response to the polarization thereof, so that the light becomes a plurality of linearly polarized light beams with an identical polarized direction after passing through the polarization rotator 140. Thereafter, the linearly polarized light beams are converged by the second lens 150 and overlapped on the object 160.

A detailed description for each component and the relation therebetween is given below. The primary function of the light source 100 and the reflecting mirror 110 is to converge as much light emitted from the light source 100 to the front end of the double-layer square-pillar-like integrator 120 as possible. Therefore, an elliptical reflecting mirror is preferred in this embodiment, and the light source 100 is located at a first focus point of the elliptical reflecting mirror. The light emitted from the light source 100 thus converges at a second focus point of the elliptical reflecting mirror. And if the front end of the double-layer square-pillar-like integrator 120 is also positioned at the second focus point, then the light emitted from the light source will focus on the end surface and enter the double-layer square-pillar-like integrator 120.

Figure 6:
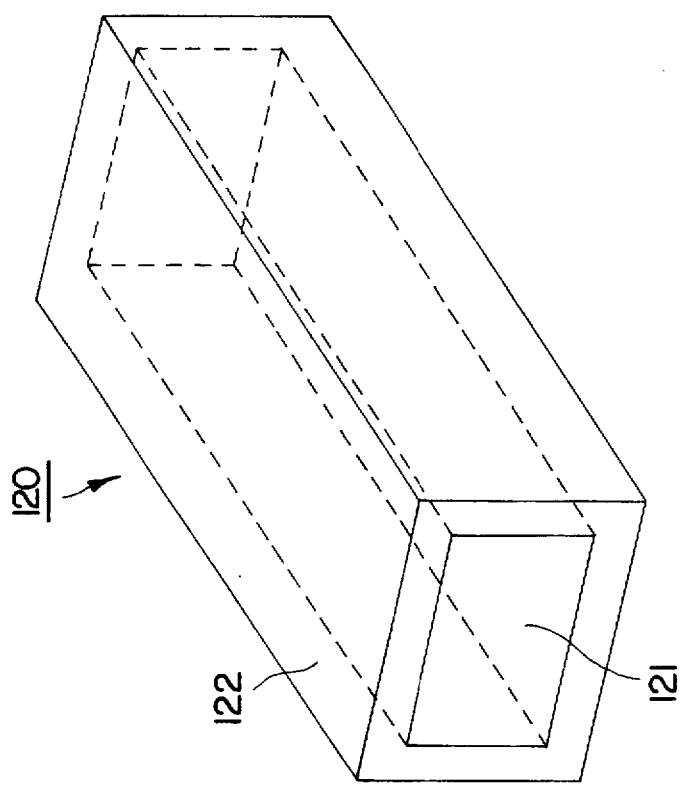
FIG. 6 is an enlarged diagram illustrating the square-pillar-like internal reflection type integrator employed in the projection display system shown in FIG. 5.
Figure 7:
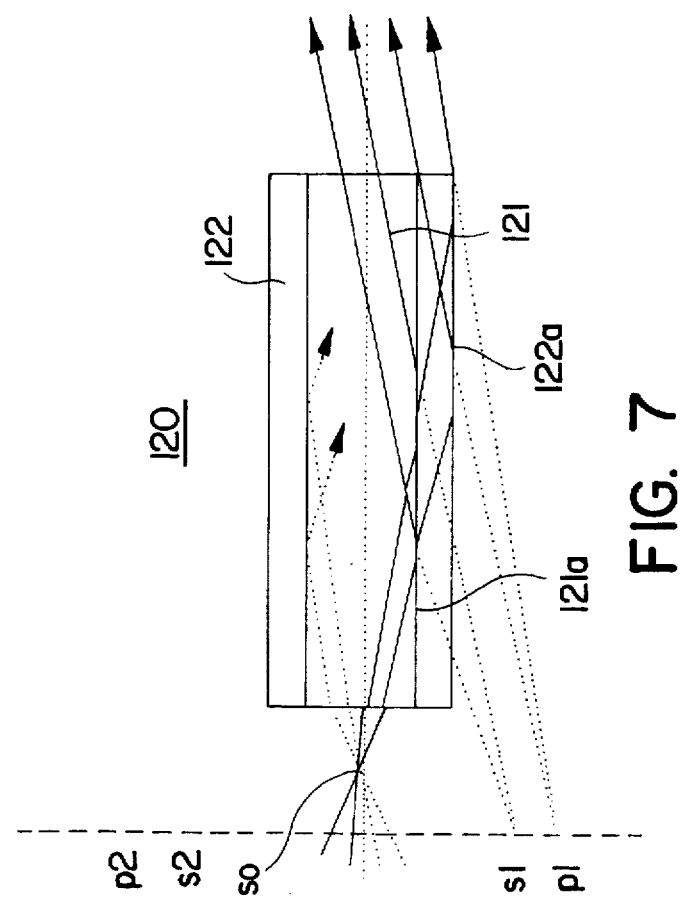
FIG. 7 is a diagram illustrating the optical path of totally reflected and separating the S and P polarization modes in the square-pillar-like integrator shown in FIG. 6.
Figure 8:
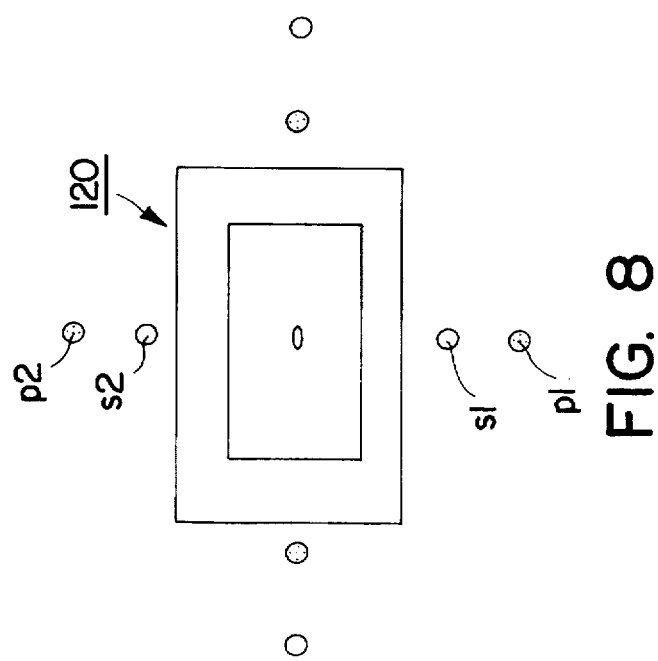
FIG. 8 is a diagram illustrating the positional relationship between the square-pillar-like integrator and the virtual images formed by passing the converging light beam from the source through the square-pillar-like integrator.

The totally reflective angle of the double-layer square-pillar-like integrator is 41.14 degrees since the reflective index of glass is about 1.52. Therefore, the light incident into the double-layer square-pillar-like integrator can be transmitted therein due to the totally reflective phenomenon. Referring to FIG. 6, the present invention achieves the objects of changing the distribution of optical field and separating the polarizations of the incident light by employing the double-layer square-pillar-like integrator. That is, while the light passes through the double-layer square-pillar-like integrator, the converged light spot forms a plurality of virtual light spots at the neighboring plane due to the total reflection phenomenon. In addition, the original light source with a circular aperture may transform into an output light beam with a rectangular cross section due to the total reflective effect. This double-layer square-pillar-like integrator includes an inner layer of glass rod 121 and an outer layer of glass pillar 122. Either an optical birefringent thin film or a coating that can separate the light of different polarizations must be formed between the inner layer of glass rod 121 and the outer layer of glass pillar 122. As shown in FIG. 7, the incident light with S-polarization is reflected at the surface 121a of the inner layer of glass rod 121, and the incident light with P-polarization is reflected at the surface 122a of the outer layer of glass pillar. When the converged light spot So is incident to the inner layer of the double-layer square-pillar-like integrator, the S-polarized portion is reflected at the interface 121a of the inner layer and the outer layer, but the P-polarized portion may be transmitted through the interface. And the P-polarized portion is reflected at the surface of the outer layer of glass pillar 122. If reversely tracking the reflected light of the S-polarization and the P-polarization, a plurality of virtual light spots can be located on the focus plane of the converged light spot So, which includes the light spots with S-polarization S1, S2 and so on, and the light spots with P-polarization P1 and P2, etc. As shown in FIG. 8, the symbol 'o' is used to represent S-polarization and '●' to represent P-polarization. Since the polarization directions of the S-polarization and the P-polarization are defined by the incident light and its reflective plane, the polarizations of the light spots at the corresponding positions in the horizontal direction and in the vertical direction are opposite. These virtual light spots form real images on the image plane after passing through the first lens. In this embodiment, the polarization rotator is located at this image plane.

Figure 9:
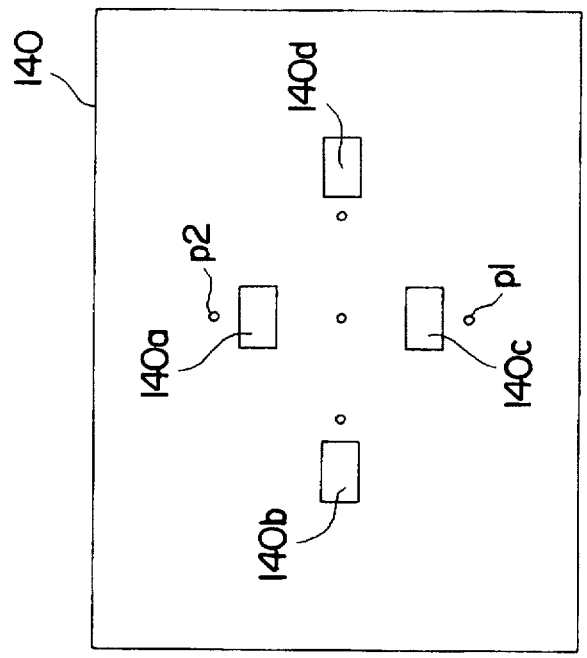
FIG. 9 is a diagram illustrating a polarizer employed in the projection display system shown in FIG. 5.

The polarization rotator which has the function of rotating the polarization angle of the incident light 90 degrees can be made of liquid-crystal or mica, so that it can be used over the wavelength range of visible light, i.e., from 400 nm to 750 nm. Referring to FIG. 9, for manufacturing, the polarization rotator is of a block type, which only rotates a certain kind of polarization while leaving the other one unchanged. For example, the polarization rotator may rotate the S-polarized light 90 degrees and keep the P-polarized light unchanged. Therefore, each block 140a to 140d of the polarization rotator 140 as shown in FIG. 9 must be arranged corresponding to the polarized light spots as shown in FIG. 8. The light becomes linearly polarized light with an identical direction of polarization after passing through the polarization rotator. This can avoid consuming too much optical energy on the liquid-crystal panel after projecting the light onto the liquid-crystal panel. As a result, the optical efficiency of the system is improved.

Figure 10:
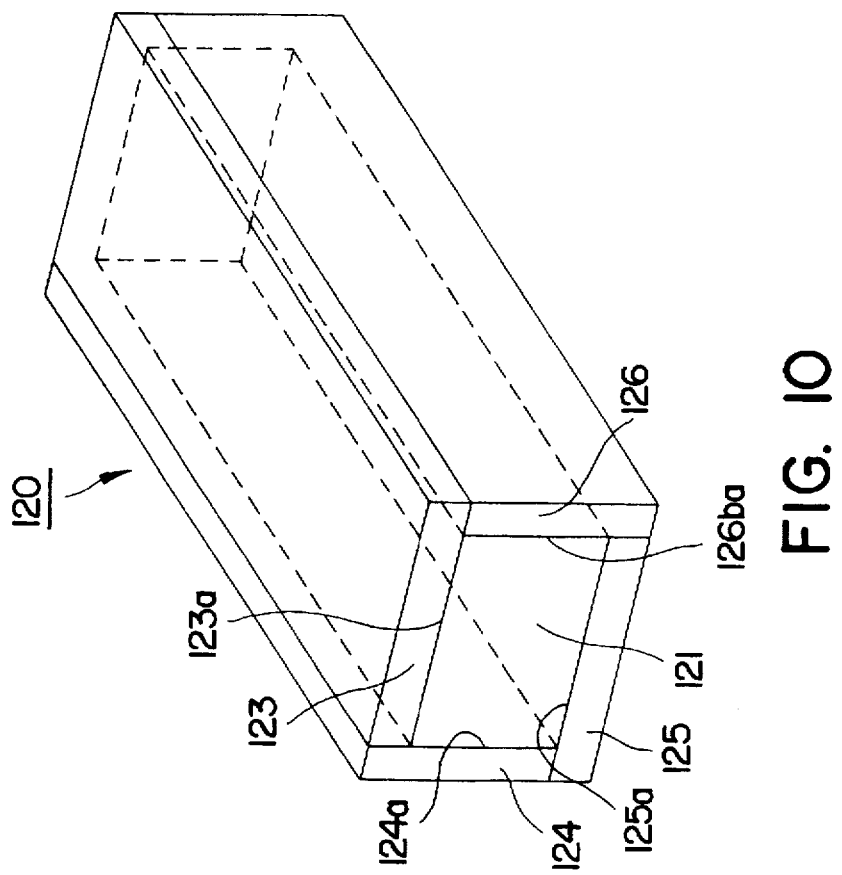
FIG. 10 is a diagram illustrating an embodiment of the square-pillar-like internal reflection type integrator.

The manner of fabricating the liquid-crystal projection display system of the present invention includes the steps of: (1) setting up the projecting light source of the elliptical reflective mirror 110, wherein the cross-sectional area of the converged light spot must be smaller than the aperture of the inner layer of glass rod 121; (2) manufacturing a double-layer square-pillar-like integrator 120 as shown in FIG. 6, also referring to FIG. 10, in which the double-layer square-pillar-like integrator 120 can be constructed by coating the side surfaces 123a, 124a, 125a and 126a of the four outer layers of glass plates 123, 124, 125 and 126 with a polarization-separating film or adhering thin films with optical birefringence on the side surfaces 123a to 126a, and then using optical adherent to fixedly assemble the four outer layers of glass plates 123 to 126 with the inner layer of glass rod 121 as shown in FIG. 10; (3) manufacturing the polarization rotator 140, that is, determining the image positions of the polarized light spots according to the curvature of the elliptical reflective mirror and the dimension of the double-layer square-pillar-like integrator, then employing two glass sheets to hold liquid-crystal or mica sheet corresponding to the positions of the polarized light spots having a certain polarization, i.e., P-polarization or S-polarization; (4) selecting a corresponding lens set, that is the first lens and the second lens, according to the area of the liquid-crystal panel, to make the amplifying illuminated surface fit the liquid-crystal panel.

Since the present invention uses a converged light spot to redistribute the optical energy, all of the components employed in the system occupy a relatively small volume. Take the double-layer square-pillar-like integrator for example. Its length is about 5 cm, and both its width and height can be less than 1 cm. Hence, the liquid-crystal projection display system constructed by the components of the present invention is provided with the advantages of reduced volume, decreased weight and improved optical efficiency over the prior art.

Furthermore, the present invention is not limited to the above described embodiment, and variations and modifications may be made without departing from the scope of the present invention.

What is claimed is:

1. A liquid-crystal projection display system, comprising:
   a double-layer square-pillar-like integrator, including an inner layer and an outer layer, having a polarization-separating thin film formed between the inner layer and the outer layer;
   a converging light source for generating light converged at a point near one end surface of the double-layer square-pillar-like integrator, so that most of the light emitted from the light source enters the double-layer square-pillar-like integrator, and different polarized light is transmitted by being totally reflected off of surfaces of the inner layer and the outer layer respectively;
   a first lens for forming real light spots on an image plane from virtual light spots formed by totally reflecting the different polarized light transmitted in the double-layer square-pillar-like integrator;
   a polarization rotator located at the image plane, for optionally rotating the polarization angle of the real light spots which have a certain polarization, so that the polarization angles of all the real light spots are identical; and
   a second lens for evenly converging and projecting light beams from the light spots with an identical linear polarization to overlay on an object.

2. A liquid-crystal projection display system as claimed in claim 1, wherein the object is an liquid-crystal panel.

3. A liquid-crystal projection display system as claimed in claim 1, wherein the polarization-separating thin film is an optical birefringent thin film.

4. A liquid-crystal projection display system as claimed in claim 1, wherein the polarization-separating thin film is coated thereon and is employed to separate P-polarized light and S-polarized light.

5. A liquid-crystal projection display system as claimed in claim 1, wherein the converging light source includes a light source and an elliptical reflecting mirror, the light source being positioned at one focus point of the elliptical reflecting mirror, so that light emitted from the light source converges at another focus point of the elliptical reflecting mirror.

6. A liquid-crystal projection display system as claimed in claim 1, wherein the polarization rotator is arranged corresponding to the light spots formed on the image plane, and rotates one of the polarizations to cause the light passing therethrough to be an identical linear polarization.

7. A liquid-crystal projection display system as claimed in claim 2, wherein the aspect ratio of cross section of the double-layer square-pillar-like integrator is equal to the aspect ratio of the liquid-crystal panel.

8. A liquid-crystal projection display system as claimed in claim 6, wherein the polarization rotator is arranged in blocks.

9. A liquid-crystal projection display system as claimed in claim 6, wherein the polarization rotator is made of liquid-crystal.

10. A liquid-crystal projection display system as claimed in claim 6, wherein the polarization rotator is made of mica.

11. A liquid-crystal projection display system as claimed in claim 7, wherein the aspect ratio of cross section of the double-layer square-pillar-like integrator is 16:9.

12. A liquid-crystal projection display system as claimed in claim 7, wherein the aspect ratio of cross section of the double-layer square-pillar-like integrator is 4:3.

* * * * *